US011084629B1

(12) United States Patent
Kleyman et al.

(10) Patent No.: US 11,084,629 B1
(45) Date of Patent: Aug. 10, 2021

(54) REUSABLE PUSHER FOR INTEGRATED SQUEEZABLE CONTAINER

(71) Applicants: Gennady I Kleyman, Brooklyn, NY (US); Yuriy Chernov, Brooklyn, NY (US)

(72) Inventors: Gennady I Kleyman, Brooklyn, NY (US); Yuriy Chernov, Brooklyn, NY (US)

(73) Assignee: Kletcher, LLC, Wilmington, DE (US)

( * ) Notice: Subject to any disclaimer, the term of this patent is extended or adjusted under 35 U.S.C. 154(b) by 0 days.

(21) Appl. No.: 17/212,102

(22) Filed: Mar. 25, 2021

(51) Int. Cl.
*B65D 35/28* (2006.01)
*B65D 83/00* (2006.01)
*B65D 35/08* (2006.01)

(52) U.S. Cl.
CPC .............. *B65D 35/28* (2013.01); *B65D 35/08* (2013.01); *B65D 83/0055* (2013.01); *B65D 83/0077* (2013.01); *B65D 2255/20* (2013.01)

(58) Field of Classification Search
CPC .... B65D 35/28; B65D 35/08; B65D 2255/20; B65D 83/0055; B65D 83/0072; B65D 83/0077
See application file for complete search history.

(56) References Cited

U.S. PATENT DOCUMENTS

| | | | | |
|---|---|---|---|---|
| 1,037,753 A | 8/1919 | Kelyman et al. | | |
| 2,491,161 A | * 12/1949 | Campbell | ............... | B65D 35/28 222/103 |
| 3,325,057 A | * 6/1967 | Watson, Jr. | ............ | B65D 35/28 222/103 |
| 3,326,420 A | 6/1967 | Turner | | |
| 3,961,727 A | * 6/1976 | Spears | ................... | B65D 35/28 222/103 |
| 3,993,220 A | * 11/1976 | Troy | ..................... | B65B 69/005 222/82 |
| 4,405,062 A | * 9/1983 | Tschida, Sr. | ........... | B65D 35/28 222/102 |
| 4,502,613 A | * 3/1985 | Yamamoto | ............. | B65D 35/28 222/103 |
| 4,579,254 A | * 4/1986 | Puskarcik | .............. | B65D 35/28 222/103 |
| 4,711,373 A | * 12/1987 | Christine | ............... | A47K 5/122 222/105 |
| 5,199,611 A | * 4/1993 | Santefort | ............... | B65D 35/28 222/103 |
| 5,217,144 A | * 6/1993 | Santefort | ............... | B65D 35/28 222/103 |

(Continued)

*Primary Examiner* — Frederick C Nicolas

(57) ABSTRACT

A reusable compression device, or contents 'pusher', introduced on and removably retained by the container housing, received at a position distal from a housing opening for releasing the content, and retained in position by engaging a grooved strip integrated with or otherwise retained on and movable along the housing surface to progressively compress the housing, providing a reliable, economic and functional container outer compression member retention apparatus and method. After the container is empty, the reusable pusher will be removed from the container and then will be inserted in another integrated container or separately disposed. The embodiment according to the present invention provides economic and environmental advantages compared to disposable structures that cannot be separated.

11 Claims, 3 Drawing Sheets

(56) References Cited

U.S. PATENT DOCUMENTS

| | | | |
|---|---|---|---|
| 5,782,385 A * | 7/1998 | Soon | B65D 35/28 |
| | | | 222/103 |
| 6,019,251 A * | 2/2000 | Koga | B05C 17/00553 |
| | | | 222/94 |
| 6,302,298 B1 | 10/2001 | Chernov et al. | |
| 6,401,978 B1 * | 6/2002 | Young | B65D 35/28 |
| | | | 222/101 |
| 7,934,864 B2 * | 5/2011 | Heusser | B01F 5/064 |
| | | | 366/130 |
| 8,517,218 B2 | 8/2013 | Cherov et al. | |
| 9,919,847 B2 | 3/2018 | Kleyman et al. | |
| 2007/0194044 A1 * | 8/2007 | Chernov | B65D 35/28 |
| | | | 222/103 |
| 2008/0093378 A1 * | 4/2008 | Wolfe | B65D 35/28 |
| | | | 222/103 |
| 2013/0001256 A1 * | 1/2013 | Drennow | A47G 19/183 |
| | | | 222/214 |
| 2017/0349334 A1 * | 12/2017 | Kleyman | B32B 1/08 |
| 2021/0086952 A1 * | 3/2021 | Kleyman | B29C 66/5326 |

* cited by examiner

US 11,084,629 B1

REUSABLE PUSHER FOR INTEGRATED SQUEEZABLE CONTAINER

FIELD OF THE INVENTION

This invention relates to dispensing systems facilitating discharging the contents from integrated squeezable container, in particular, dispensing systems including an attached movable element to deform the squeezable container to urge discharge of the contained toothpaste, adhesive pastes, grease paints, various creams, shampoos, medications, and the like.

BACKGROUND OF THE INVENTION

Deformable material dispensing containers, typically tubular or other shaped housings having an openable restriction (e.g. different type of dispenser caps) at one end and being sealed at the other end, include material therein that can be displaced through the openable restriction when the material dispenser (e.g. a 'tube' embodiment) is deformed, such as by squeezing, which temporarily diminishes the volume of the housings to urge the contained included material out through the openable restriction. However, owing to the often resilient housing material and/or geometrical configuration, the housing tends to return to the original configuration or volume, delaying, redistributing, or interfering with subsequent dispensing of the included material.

Additionally, during a squeezing action, some portion of materials will be displaced in a direction opposite of the opening direction toward the openable restriction, and create a necessity to make a more complex or controlled squeezing action necessary to push the materials within the tube to the tube opening.

A wide variety of devices have been suggested and provided for the purpose of holding in a collapsible tube, a fluid or cream-like material such as a tube of toothpaste, and gradually and controllably dispensing the contents. These devices range from a simple slotted key, to ceramic rollers, to elaborate geared contraptions.

These devices generally operate with a channel receiving a tube of toothpaste or the like and provided with a means for supporting the tube so as to progressively dispense the contents of the tube. Collapsible containers or tubes typically have flat back ends and provided with an annular cross-section terminating with a relatively narrow neck, which is fitted with a screw-on cap or other such closure. When the cap is removed, the open end of the neck serves as an outlet for the product discharged from the tube for application in the ordinary course of its use. Many such tubes are made from a pliable plastic material, which one can squeeze by hand to force product out. Usually the wall thickness of plastic tubes is between 400 and 650 microns. These tubes usually do not hold their deformed configuration once the externally applied pressure is released, but rather are somewhat resilient and spring back to approximately their original shape and condition.

Other containers or tubes are laminates typically consist of multiple layers of foils (aluminum) or films that are united by extrusion or adhesive lamination. The middle film or aluminum foil is usually the barrier layer that prevents components of the medium from escaping from the tube. The barrier layer also prevents critical substances that could influence or change the products (such as oxygen) from the environment from entering into the tube. Interior and exterior films of the laminate tubes are selected to ensure that the material dispenser opening, e.g. open end of the tube distal from the openable restriction, printability and the necessary non-reactive properties with respect to the product. Currently typical material dispenser walls comprise laminates of different layers in total thicknesses between 250 and 400 microns.

For the tubes which 'spring back' to their approximate original shape after external compression, the product they contain can once again spreads out over the full volume of the tube. As the contents are dispensed from the tube, the decreasing amount remaining in the tube can be increasingly hard to dispense by the usual method of applying finger pressure across the tube or material dispenser.

Similarly, in cases where the tubes remain deformed, pockets of cream-like products may be scattered throughout the tube. Again, this unwanted, sporadic accumulation throughout the tube interior, of the product to be discharged prevents the latter from being fully squeezed out of the tube by regular finger pressure. Some attempts have been made previously to provide external mechanical devices, which can apply greater external force, or more evenly distribute the external force applied, than is possible using one's fingers only. For a dispenser tube, the external mechanical device can be secured within or along a channel by means of a flattened end, and a slide progressively engaging the tube along its length to empty its contents, and the structure may have certain disadvantages associated with a substantial amount of material remains trapped at a conically shaped end of tube. It is therefore necessary, that the user provide an additional force to further squeeze the remaining material out of the tube.

Furthermore, prior dispensing arrangements may have limited flexibility with regard to the number of sizes of packages that could be used in a particular device, as described by a flexible wall of tube having a plurality of depressions and projections arranged in the longitudinal direction and squeezing mechanism engage with those wall depressions and projections. Wall thickness of laminated tubes is typically 250-400 microns and wall thickness of plastic extruded tube is typically 400-650 microns, and include depressions and projections on a thin wall with ability to engage with the overlying squeezing mechanism and protect squeezing mechanism from displacement during tube squeezing is impossible.

Furthermore, prior dispensing arrangements may have limited flexibility with regard to the number of sizes of packages that could be used in a particular device such as in embodiments which provide an adjustable external compression device introduced on the housing distal from the opening releasing the content, and retained in position by engaging a grooved strip integrated with and/or retained on and along the length of the housing surface material with a strip surface of like material, providing an outer compression member retention device.

This dispenser provides a flexible plastic strip with teeth, permanently attached to the tube surface in a desired position, with reliable engagement with the external compression device including a ratchet and pawl mechanism, to prevent external compression device pusher to move in opposite direction from the tube opening during squeezing action. During squeezing action force will be translated to the external compression device "lip" engaged with strip "teeth" to stay in this position to prevent external compression device from displacement along the strip which is permanently attached to the tube surface by being laminated or extruded on the tube surface by welding or by permanent glue.

However, for various reasons, it is desirable to have an integrated container, laminated or extruded from plastic, to include a removable and/or reusable external compression device working and/or integrated with containers to provide environmental advantage reusability or enhanced recycling over the previously described permanently attached disposable container and external compression device, or contents 'pusher'.

SUMMARY OF THE INVENTION

The present invention provides embodiments which provide a reusable compression device, or contents 'pusher', introduced on and removably retained by the container housing, received at a position distal from a housing opening for releasing the content, and retained in position by engaging a grooved strip integrated with or otherwise retained on and movable along the housing surface to progressively compress the housing, providing a reliable, economic and functional container outer compression member retention apparatus and method. After the container is empty, the reusable pusher will be removed from the container and then will be inserted in another integrated container or separately disposed. The embodiment according to the present invention provides economic and environmental advantages compared to disposable structures that cannot be separated.

BRIEF DESCRIPTION OF THE DRAWING

These and further details of the present invention will be better understood by reading the following Detailed Description, taken together with the Drawing figures, wherein.

DETAILED DESCRIPTION

The embodiments of the present invention include various forms of enclosed packaging having a substance held within the boundaries of the form and dispensed through an opening, preferably a re-sealable opening, and packaging wherein various amounts or portions are dispensed at different times. Furthermore, the contents are dispensed at one point along the periphery of the container and there can be described a generally opposite peripheral region or point that receives a compression device or 'pusher', between which an axis is envisioned and accessible to an overlying structure as described below.

Figure 1:
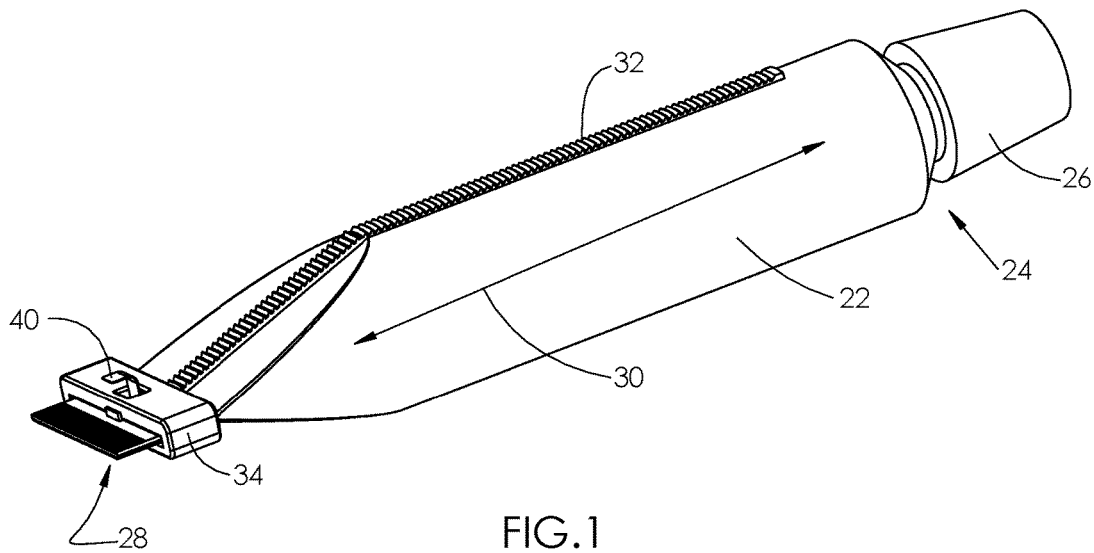
FIG. 1 is a perspective view of integrated container with strip and pusher according to first embodiment of the present invention.

An exemplary embodiment of the present invention of FIG. 1 comprises a tubular container 22 that extends along an axis 30 with an end 24 that is re-sealable, e.g. with a screw-on cap 26 and a flattened, sealed end 28 typically at opposite ends of the container axis 30. The embodiment includes and is integrated with a strip 32 along the exterior of the tubular container 22 parallel to the axis, and a compression device 34 that moves over the sealed end 28 and onto and compressing the exterior of the tubular container 22. As the compression device moves over the container 22 exterior, it engages the strip 32 to permit motion toward the re-sealable end 24 and restrict motion to the sealed end 28. The embodiments according to the present invention include structures that permit release of the compression device 34 restricted motions and allow removal of the compression device 34 from the tubular container 22.

Figure 2:
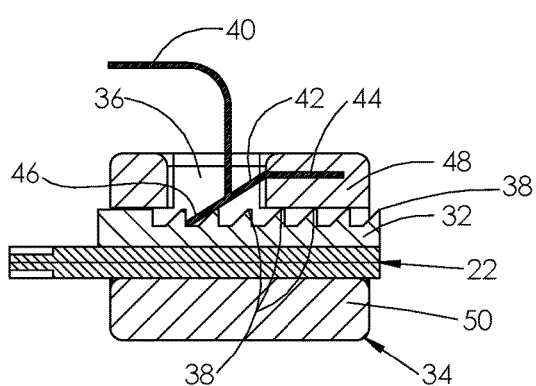
FIG. 2 is a cross-sectional view of the pusher engaged with strip "teeth" of the embodiment of FIG. 1.
Figure 3:
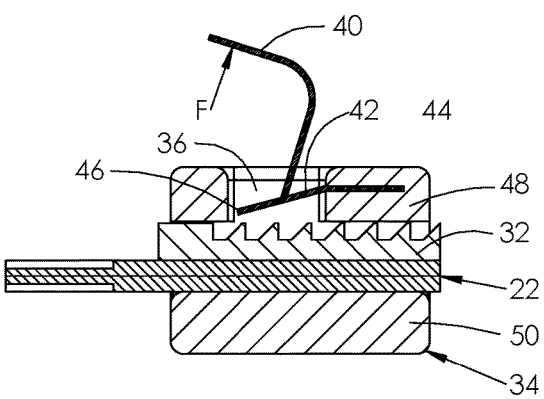
FIG. 3 is a cross-sectional view of the pusher disengaged from the strip permitting the pusher to be removed from the integrated container of the embodiment of FIG. 1.

According to the embodiment of FIGS. 1-5, the compression device 34 includes an opening 36 having a resilient member 42 anchored (e.g. molded into 44) at one end on or in the compression device 34 upper portion 48, and at another end having a tip 46 that engages the strip 32 (FIG. 2), and further including a lever 40 extending generally away from the resilient member 42 between the tip 46 and opening 36 wall where resilient member 42 is anchored. In this embodiment, the resilient member 42 and tip 46 are obliquely disposed relative to the tubular container outer surface and strip 32, so that motion in one direction (toward re-sealable end 24) is permitted and a reverse direction (toward sealed end 28) is normally restricted. In the embodiment of FIG. 2, the strip 32 further included outward facing teeth 38 which engage and retain the tip 46 of the resilient member 42, and further have inclined surfaces to encourage a deeper penetration of the tip 46 into the grooves between the teeth 38. The resilient member 42 and its tip 46 are lifted from engagement of the tubular container 22 and strip 32 by outward (away from the tubular container 22 and strip 32) force F on lever 40, which causes resilient member 42 to bend accordingly. When the tip 46 is disengaged from tubular container 22 or strip 32, the compression device may be retracted from and moved away from re-sealable open end 24, to permit separate disposal, recycling, or refilling of tubular container 22, or used on another tubular container. In some embodiments, the lever 40 is bent (as shown, or otherwise) to accommodate a convenient application of force F.

Figure 4:
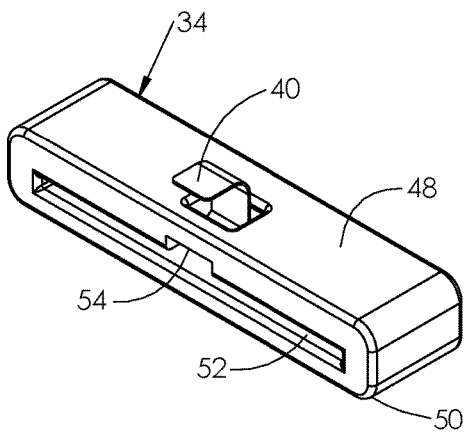
FIG. 4 is an isometric view of the pusher of the embodiment of FIG. 1.
Figure 5:
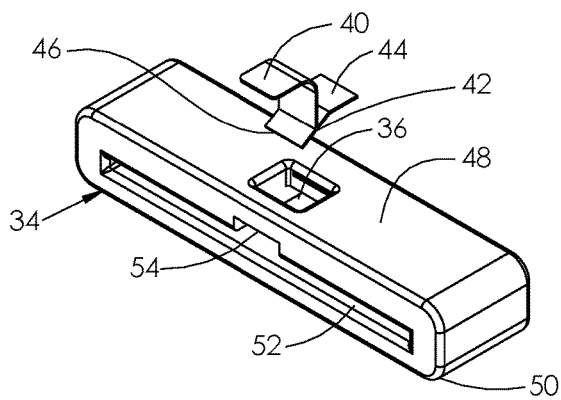
FIG. 5 is an exploded of the pusher of the embodiment of FIG. 1.
Figure 6:
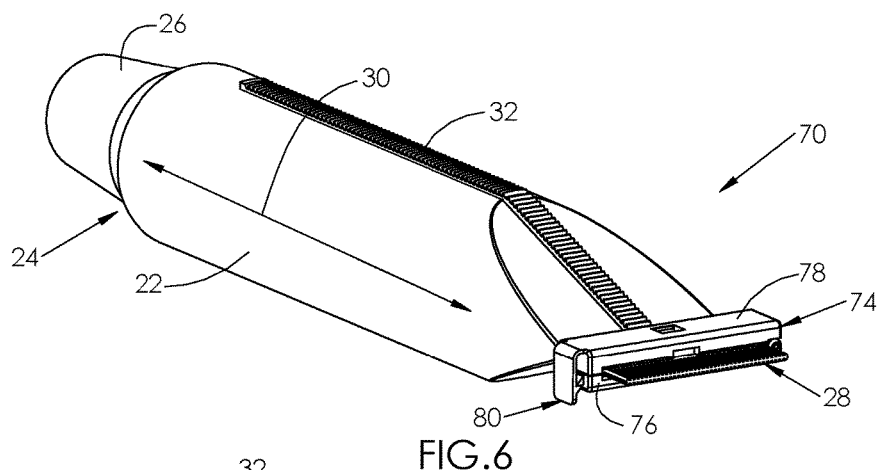
FIG. 6 is a perspective view of integrated container with strip and pusher assembled according to a second embodiment of the present invention.
Figure 7:
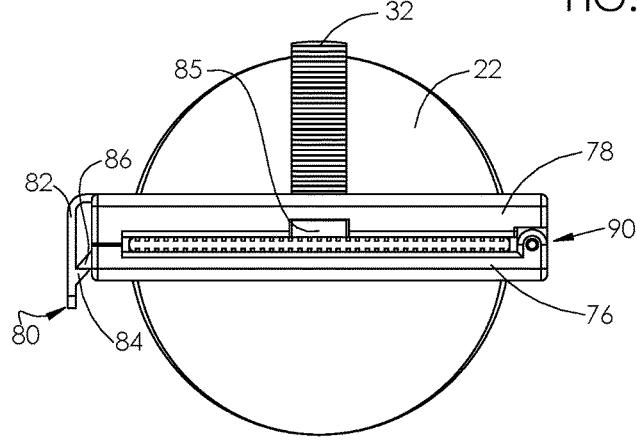
FIG. 7 is a rear view of integrated container showing the pusher engaged with the strip, according to a second embodiment of the present invention.
Figure 8:
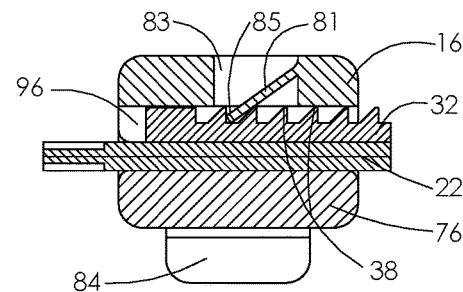
FIG. 8 is a cross-sectional view of the pusher engaged with strip "teeth", according to a second embodiment of the present invention.
Figure 9:
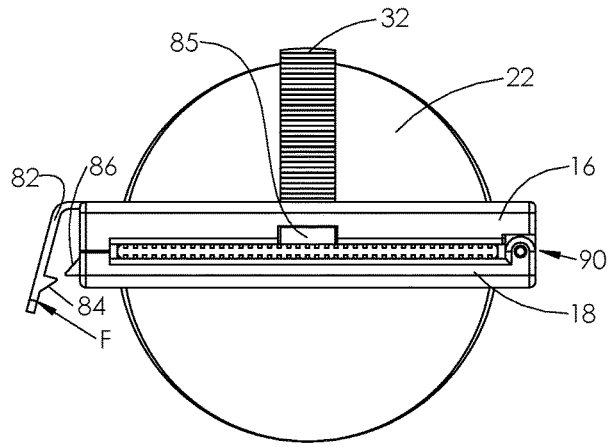
FIG. 9 is a rear view of the integrated tube according to a second embodiment of the present invention when pusher flexible retaining snap disengaged from pusher snapping stop and pusher ready to be open.
Figure 10:
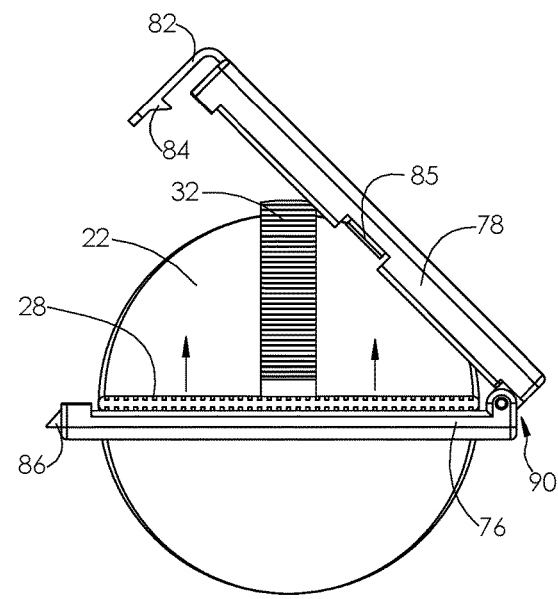
FIG. 10 is a rear view when pusher in open position and ready to be removed from the integrated tube according to a second embodiment of the present invention.
Figure 11:
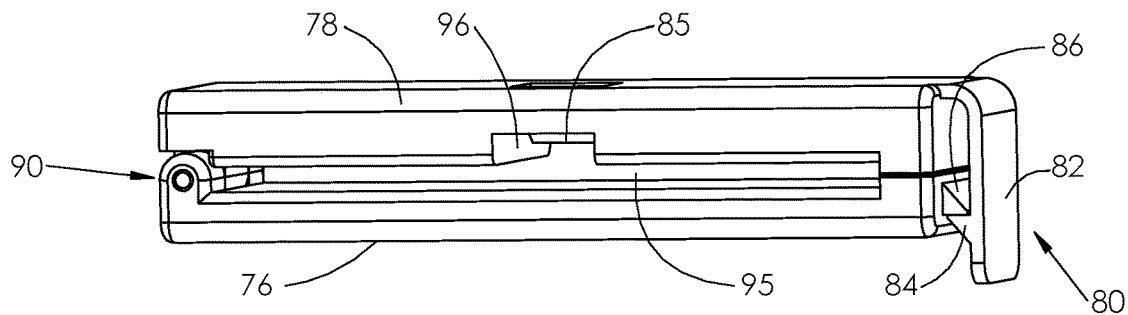
FIG. 11 is a perspective view of the pusher according to a second embodiment of the present invention.
Figure 12:
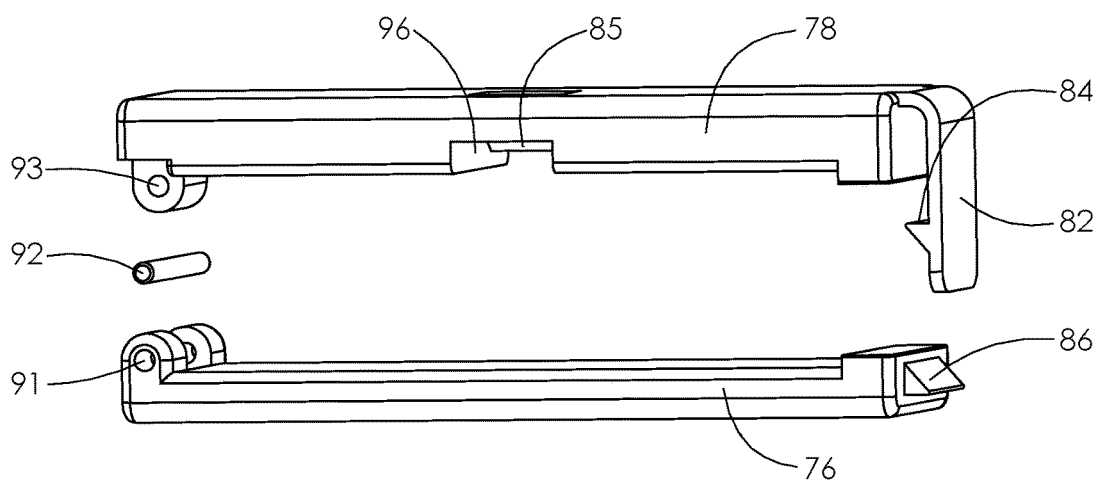
FIG. 12 is an exploded of the pusher according to a second embodiment of the present invention.
Figure 13:
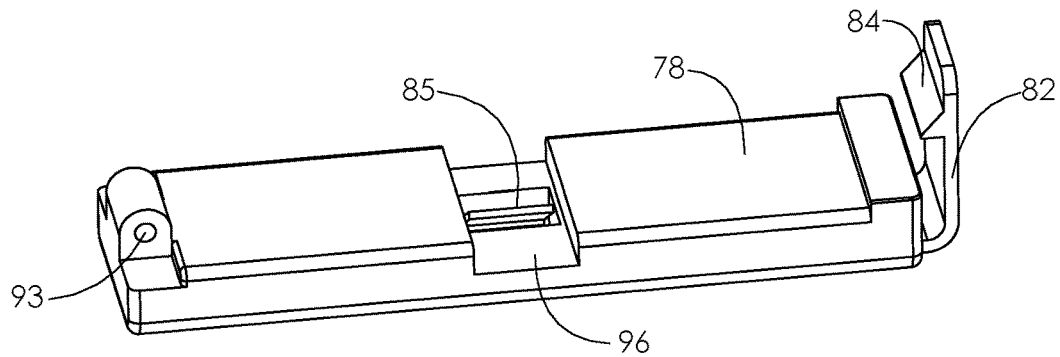
FIG. 13 is a perspective view of the pusher upper body according to a second embodiment of the present invention.
Figure 14:
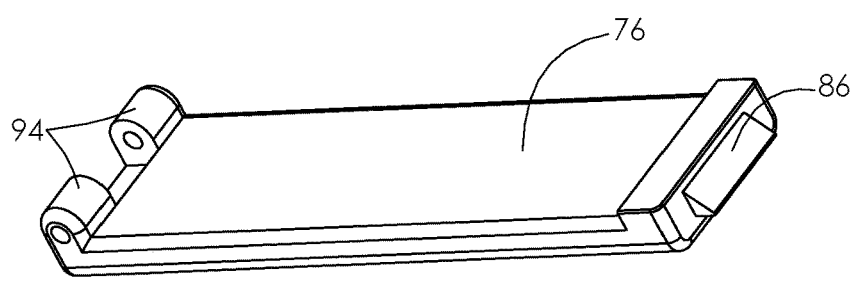
FIG. 14 is a perspective view of the pusher lover body according to a second embodiment of the present invention.

In the perspective views of FIGS. 4 and 5 of the compression device 34, showing the resilient member 42 (and connected components 40, 44, 46) respectively installed and separated within the compression device 34 having upper portion 48 and lower portion 50, which may be separate or more typically, formed together, having opening 52 sufficiently wide and tall to accept the sealed end 28 of the tubular container until the resilient member 42 tip 46 engages the tubular member outer surface or strip 32 (if used). Furthermore, if strip 32 is used, the upper portion has a widened opening 54 to accommodate the strip 32 and the teeth 38 therein.

Relative to engage the same tubular container 22 of FIGS. 1-5, a further embodiment 70 of the removable compression device 74 is shown in in FIGS. 6-14, wherein a latch 80, which in this embodiment is formed to include a resilient member 82 connected to an upper portion 78 that is formed to include a protrusion 84, and be biased to engage a protruding member 86 connected to and on the end of lower portion 76 opposite the hinge 90, that together when the upper portion and lower portion are mated and latch 80 is engaged, form an opening (95, FIG. 11) receive and surround the sealed end 28 of the tubular container 22. A recess 92 is formed in the upper portion 78 to accommodate the increased dimension from the strip 32 (if included). The latch 80 and its components 82, 84, and 86 may include other latch structures and may be formed and/or molded from the upper portion 78 and lower portion 76.

When an outward (away from hinge 90) force F is applied to the end of the resilient member 82 (FIG. 9), the resilient member 82 bends to release the engagement of protrusion 84 from the protrusion 86 and allow the upper portion 78 to pivot away from the lower portion 76 (FIG. 10) and permit removal of the compression device 74 from the tubular container 22 and reapplied or discarded as with the compression device 34, above.

Similar to the embodiment 20, the compression device 74 upper portion 78 includes a resilient member 81 having a tip 85 disposed to obliquely engage strip 32 (and teeth 38 if used). The resilient member 83 and/or tip may comprise separate elements connected to the upper portion 78, or be formed from the material of the upper portion 78, and be disposed within upper portion 78 aperture 83.

For clarity, the compression device 74 of embodiment 70 is shown in the variously oriented perspective FIGS. 11-14 without the tubular container 22. The latch 80 and components 82, 84, and 86 are shown as being formed from upper member 78 and lower member 76. Protrusions 84 and 86 also include ramp-like tapers to facilitate closure of the upper member 78 and lower member 76 by urging the resilient member 82 apart to permit protrusion 86 to pass the protrusion 84, and allow perpendicular surfaces to engage and provide a closed latch function. Also shown is the recess 96 formed to receive strip 32, and recess 96 reveals the tip 85 of resilient member 81. The upper portion 78 and lower portion 76 are pivotally joined by hinge 90, that includes members (e.g. 94) which face and intersperse, and have aligned holes 91, 93 into which a pin 92 is received, which provides the axis of hinge motion between upper portion 78 and lower portion 76 between open (e.g. FIG. 10) or closed (e.g. FIG. 7).

The concepts provided can be applied to single chamber tubular container 22 as shown, or to containers having two or more chambers, and may be configured to be adapted to containers various shapes. A 'live' hinge comprising a flexible strip between upper and lower members or formed from the upper and/or lower members, may also be used in place of the hinge 90 described herein. Further modifications and substitutions made by one of ordinary skill are within the scope of the present invention, which is not limited, except by the claims which follow.

What is claimed is:

1. A compression device for use with a compliant container having an outlet at one end and a flattened closure at a second, opposite end and an axis therebetween, and an outer surface region extending parallel said axis, comprising:
   a pair of facing compression members spaced to receive said flattened closure therebetween and engage said compliant container outer surface region as said pair of facing compression members are advanced along said compliant tubular container axis reducing the internal volume of said compliant tubular container;
   a resilient member retained on one of said facing compression members, and includes a tip disposed to engage said outer surface region unidirectionally along said axis; and
   a release member disposed to allow disengagement of said resilient member from said outer surface region.

2. The compression device of claim 1, further comprising a lifting finger disposed on said resilient member proximal said resilient member tip, receiving an external force thereon coupled to said resilient member to cause said resilient member to disengage said outer surface region.

3. The compression device of claim 2, wherein said resilient member extends within an aperture within one of said facing compression members, and said resilient member includes a portion distal to said tip and connected to said one of said facing compression members, wherein said lifting finger is attached to said resilient member between said tip and said one of said compression members within said aperture.

4. The compression device of claim 1, wherein said resilient member obliquely engages said outer surface region.

5. The compression device of claim 1, further including an elongated strip disposed on said outer surface region and including regular protrusions therealong, wherein said resilient member engages said elongated strip.

6. The compression device of claim 1, wherein said pair of facing compression members are elongated and pivotably connected by a hinge at one end and include a releasable clip at an opposite end to provide facing disposition of said compression members, and engagement of said outer surface region by said resilient member tip between said hinge and said releasable clip, and disengagement of said outer surface region when said releasable clip is disengage, permitting said facing compression members to separate and disengage from said outer surface region.

7. The compression device of claim 6, wherein said resilient member extends within an aperture within one of said facing compression members, and said resilient member includes a portion distal to said tip and connected to said one of said facing compression members.

8. The compression device of claim 7, wherein said resilient member is formed from said one of said facing compression members.

9. The compression device of claim 6, wherein a first of said pair of facing compression members includes a member extending from an end thereof opposite said hinge, and a second of said pair of facing compression members includes protrusion extending from said end thereof opposite said hinge and formed to engage a first facing compression member arm while said first and said second of said pair of facing compression members engage said compliant container.

10. The compression device of claim 9, wherein said first facing compression member arm is movable away from said second compression member protrusion, allowing separation of said pair of facing compression members and disengagement from said compliant container.

11. The compression device of claim 6 wherein said hinge comprises a live hinge.

\* \* \* \* \*